(12) United States Patent
Rajauria et al.

(10) Patent No.: US 10,783,913 B1
(45) Date of Patent: Sep. 22, 2020

(54) DATA STORAGE DEVICE MEASURING AIR BEARING RESONANT FREQUENCY TO CALIBRATE FLY HEIGHT TOUCHDOWN POWER

(71) Applicant: Western Digital Technologies, Inc., San Jose, CA (US)

(72) Inventors: Sukumar Rajauria, San Jose, CA (US); Erhard Schreck, San Jose, CA (US); Weldon M. Hanson, Rochester, MN (US); Yeoungchin Yoon, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/396,883

(22) Filed: Apr. 29, 2019

(51) Int. Cl.
*G11B 5/54* (2006.01)
*G11B 5/60* (2006.01)
*G11B 5/39* (2006.01)
*G11B 5/00* (2006.01)

(52) U.S. Cl.
CPC ............. *G11B 5/6076* (2013.01); *G11B 5/39* (2013.01); *G11B 5/6041* (2013.01); *G11B 2005/0018* (2013.01); *G11B 2005/0021* (2013.01); *G11B 2005/0024* (2013.01)

(58) Field of Classification Search
CPC ... G11B 5/54; G11B 5/59633; G11B 5/59638; G11B 1/125; G11B 5/127; G11B 11/10; G11B 11/105; G11B 5/31; G11B 5/6047; G11B 2005/0021
USPC ............................................. 360/75, 59, 328
See application file for complete search history.

(56) References Cited

U.S. PATENT DOCUMENTS

| 6,275,345 | B1 | 8/2001 | Ottesen et al. |
| 7,119,979 | B2 * | 10/2006 | Fong ...................... G11B 5/455 360/75 |
| 7,486,457 | B2 * | 2/2009 | Jen ......................... B82Y 10/00 360/25 |
| 8,149,541 | B2 | 4/2012 | Baumgart et al. |
| 8,310,779 | B2 * | 11/2012 | Hanchi ............... G11B 5/3133 360/128 |
| 8,547,661 | B2 | 10/2013 | Bai |
| 8,699,173 | B1 | 4/2014 | Kang et al. |
| 8,797,671 | B2 | 8/2014 | Ruiz et al. |

(Continued)

OTHER PUBLICATIONS

Sukumar Rajauria, Robert Smith, Erhard Schreck, "Novel ultra-sensitive air bearing excitation based resonance contact detection in Heat assisted magnetic recording (HAMR)" ASME 2017 Conference on Information Storage and Processing Systems, San Francisco, California, USA, Aug. 29-30, 2017.

*Primary Examiner* — Nabil Z Hindi (57) ABSTRACT

A data storage device is disclosed comprising a head actuated over a disk surface, wherein the head comprises a plurality of elements including a write assist element. A bias signal applied to the write assist element is controlled such that the write assist element is substantially unprotruded, and while the write element is substantially unprotruded, an air bearing resonant frequency (ABRF) of the head and disk surface is measured. The bias signal applied to the write assist element is controlled such that the write assist element protrudes toward the disk surface, and while the write assist element protrudes toward the disk surface, the head is excited at the measured ABRF and the head touching down onto the disk surface is detected.

19 Claims, 5 Drawing Sheets

(56) References Cited

U.S. PATENT DOCUMENTS

| | | |
|---|---|---|
| 8,970,978 B1 | 3/2015 | Knigge et al. |
| 9,007,724 B1 | 4/2015 | Furukawa et al. |
| 9,117,474 B1 | 8/2015 | Contreras et al. |
| 9,123,370 B1 | 9/2015 | Ruan et al. |
| 9,222,994 B2 | 12/2015 | Zhou et al. |
| 9,275,672 B2 | 3/2016 | Shiroishi et al. |
| 9,355,668 B2 | 5/2016 | Nishida et al. |
| 9,401,169 B1 | 7/2016 | Canchi et al. |
| 9,595,280 B2 | 3/2017 | Canchi et al. |
| 9,595,281 B2 | 3/2017 | Rajauria et al. |
| 2010/0259850 A1 | 10/2010 | Miyake et al. |
| 2017/0140779 A1 | 5/2017 | Koui |

\* cited by examiner

DATA STORAGE DEVICE MEASURING AIR BEARING RESONANT FREQUENCY TO CALIBRATE FLY HEIGHT TOUCHDOWN POWER

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface. Since the quality of the write/read signal depends on the fly height of the head, conventional heads may also comprise an actuator for controlling the fly height. Any suitable fly height actuator (FHA) may be employed, such as a heater which controls fly height through thermal expansion, or a piezoelectric (PZT) actuator.

DETAILED DESCRIPTION

Figure 1A:
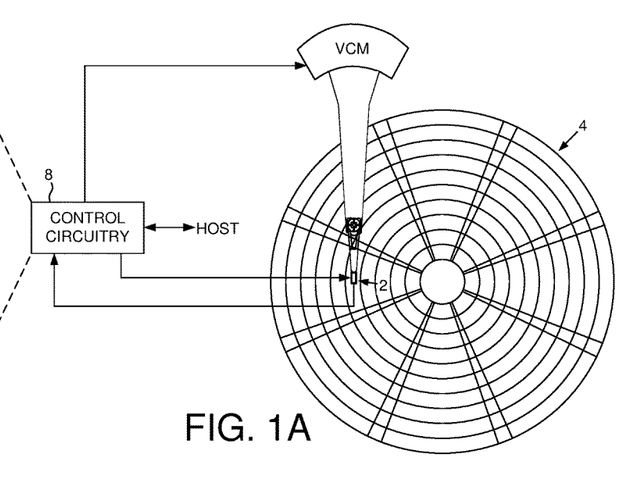
FIGS. 1A and 1B show a data storage device in the form of a disk drive according to an embodiment comprising a head actuated over a disk surface, wherein the head comprises a plurality of elements including a write assist element.
Figure 1B:
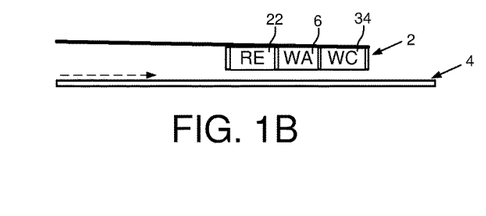
Figure 1C:
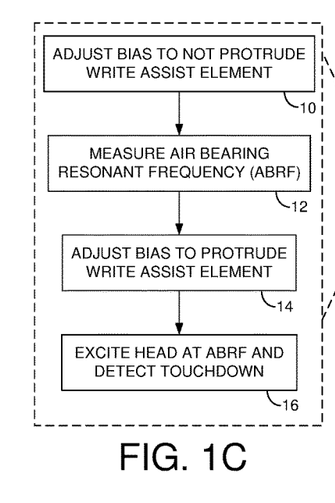
FIG. 1C is a flow diagram according to an embodiment wherein touchdown of the head onto the disk surface is detected while exciting the head at a measured air bearing resonant frequency (ABRF).

FIG. 1A shows a data storage device in the form of a disk drive according to an embodiment comprising a head 2 (FIG. 1B) actuated over a disk surface 4, wherein the head 2 comprises a plurality of elements including a write assist element 6. The disk drive further comprises control circuitry 8 configured to execute the flow diagram of FIG. 1C, wherein a bias signal applied to the write assist element is controlled such that the write assist element is substantially unprotruded (block 10). While the write element is substantially unprotruded, an air bearing resonant frequency (ABRF) of the head and disk surface is measured (block 12). The bias signal is applied to the write assist element such that the write assist element protrudes toward the disk surface (block 14), and while the write element protrudes toward the disk surface, the head is excited at the measured ABRF and the head touching down onto the disk surface is detected (block 16).

Figure 2A:
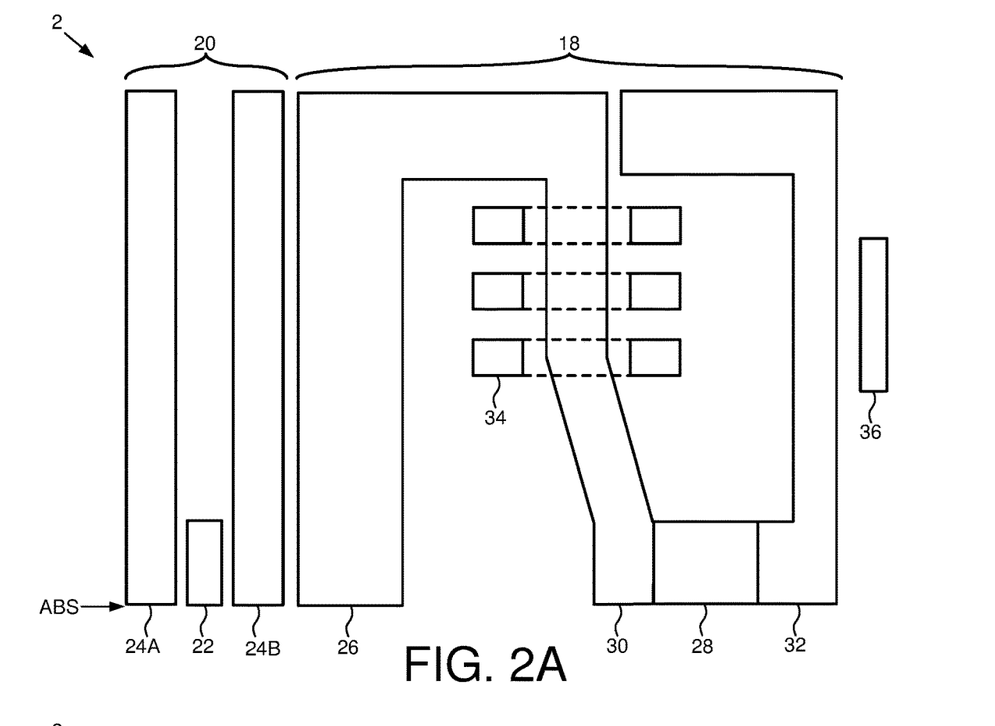
FIG. 2A shows a head according to an embodiment comprising a fly height actuator, wherein the write assist element comprises an STO.

FIG. 2 shows a cross-sectional view of an example head 2 that may be employed in the embodiments described herein, wherein the head 2 may comprise more or fewer elements in various other embodiments. In the embodiment of FIG. 2, the head 2 comprises write elements 18 configured to write data to the disk surface 4, and read elements 20 configured to read data from the disk surface 4. The bottom surface of the head 2 facing the disk surface 4 is referred to as an air bearing surface (ABS) wherein an air bearing forms between the head 2 and the disk surface 4 due to the disk spinning such that the head 2 effectively flies above the disk surface 4. The read elements 20 of the head 2 may comprise a magnetoresistive (MR) read element 22 that is fabricated between MR shields 22A and 22B. Other embodiments may employ a different read element, such as a suitable magnetic tunneling junction (MTJ) read element. The write elements 18 comprise a return pole 26, a write assist element in the form of a STO 28 fabricated between a main pole 30 and a trailing shield 32, and a write coil 34 that excites the main pole 30 to generate a magnetic write field that magnetizes the disk surface 4, thereby writing data to the disk surface 4. Other embodiments may employ a different type of write assist element 6, such as a laser diode and NFT in a HAMR embodiment.

As described in the embodiments below, the write assist element 6 (e.g., the STO 28) protrudes toward the disk surface 4 when the STO bias signal is increased in connection with executing a write operation. In one embodiment, the amplitude of the STO bias signal is selected to achieve a desired auxiliary magnetic field near a resonant frequency of the magnetic grains, thereby enabling the magnetic field generated by the write coil 30 to more readily magnetize the disk surface. In order for the auxiliary magnetic field to achieve optimal efficacy, in one embodiment a fly height actuator (FHA) 36 is biased to achieve a target fly height of the head 2 over the disk surface 4. Any suitable FHA 36 may be employed, such as a suitable thermal actuator that adjusts the fly height through thermal expansion, or a suitable mechanical actuator such as a suitable piezoelectric actuator that adjusts the fly height through mechanical deflection.

Figure 2B:
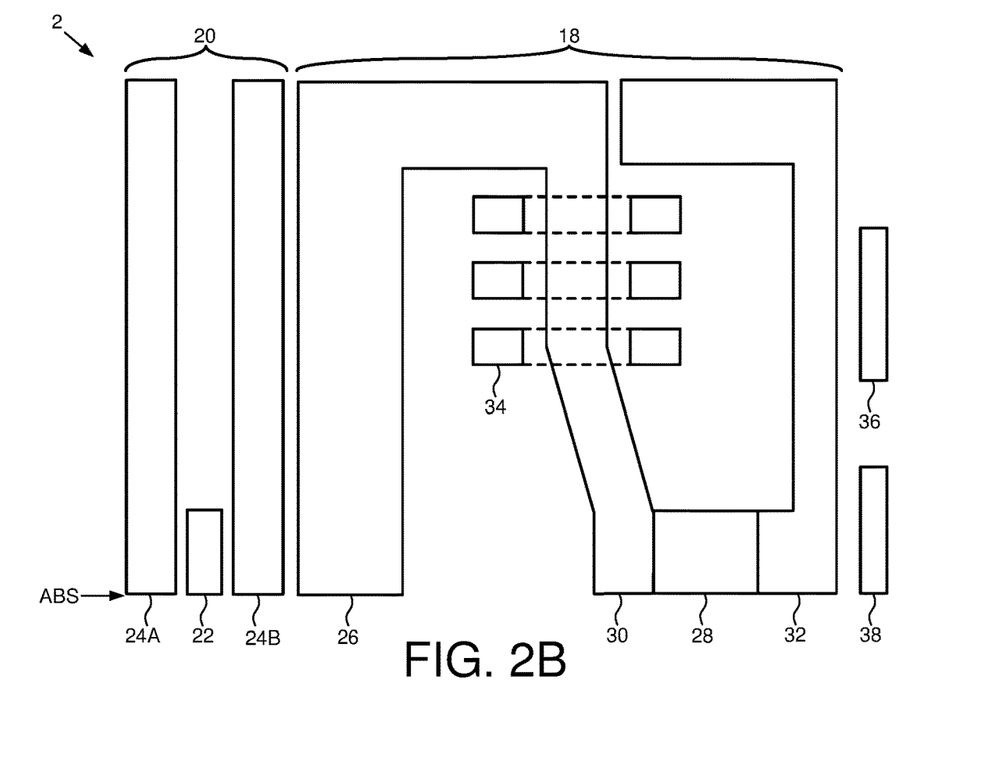
FIG. 2B shows a head according to an embodiment comprising a suitable touchdown sensor for measuring the ABRF and/or for detecting the head touchdown.

In one embodiment, the control signal applied to the FHA 36 may be calibrated in order to achieve a target fly height during write operations. For example, in one embodiment the control signal applied to the FHA 36 may be increased in order to decrease the fly height of the head until the head touching down onto the disk surface is detected. Once touchdown is detected, the operating level for the FHA control signal may be configured by subtracting a suitable offset from the touchdown level. Any suitable technique may be employed to detect the head touchdown, wherein in an embodiment shown in FIG. 2B the head 2 may comprise a suitable touchdown sensor 38 (such as a suitable capacitor, thermistor, acoustic emission transducer, etc.) for generating a touchdown signal indicating when the head touches the disk surface. In another embodiment, the read element 22 of the head 2 may operate as the touchdown sensor such that the read signal emanating from the read element 22 may indicate when the head is touching down onto the disk surface.

In one embodiment, the bias signal applied to the write assist element 6 during write operations causes the write assist element 6 to protrude toward the disk surface 4 due, for example, to thermal expansion. Accordingly in one embodiment, the write assist element 6 may be the lowest flying element during write operations, and so the target fly height during write operations may be determined relative to the fly height of the write assist element 6. That is, in one embodiment when detecting touchdown in order to calibrate the optimal FHA control signal for write operations, a bias signal may be applied to the write assist element 6 so that it protrudes toward the disk surface 4 as it would during normal write operations. During the touchdown procedure, the fly height of the head may then be decreased (e.g., by increasing the FHA control signal) until the write assist element 6 touching down onto the disk surface is detected.

In one embodiment, the write assist element 6 may protrude toward the disk surface in a needle-like fashion such that the resulting touchdown signal when contacting the disk surface may be very small and difficult to detect. In some cases, the touchdown signal due to the write assist element 6 contacting the disk surface may be too small to detect, resulting in damage to the write assist element 6 as the fly height decreases during the touchdown procedure. That is, the write assist element 6 may be effectively crushed as the head pushes down onto the disk surface if the touchdown signal generated by the write assist element 6 is too small to detect. Accordingly in one embodiment, in order to prevent damaging the write assist element 6 during the touchdown procedure the head is excited at an air bearing resonant frequency (ABRF) that naturally occurs at the ABS while the head is flying above the disk surface. In one embodiment, exciting the head at the ABRF amplifies the resulting touchdown signal as the write assist element 6 contacts the disk surface so that the touchdown event may be detected before there is physical damage to the write assist element 6.

In one embodiment, a calibration procedure may be executed to measure the ABRF prior to executing the touchdown procedure. An example of this embodiment is understood with reference to the flow diagram of FIG. 3, wherein the write assist (WA) bias signal is initialized so that the write assist element is substantially unprotruded (block 40) and the FHA control signal is initialized (block 42), for example, to a low value in order to configure a high fly height. The FHA control signal is applied to the FHA (block 44), and a sensor signal is measured over multiple frequencies of an excitation signal that excites the head at the excitation frequency (block 46). The FHA control signal is increased in order to decrease the fly height of the head (block 50), and the sensor signal again measured over multiple frequencies of the excitation signal (block 46). This process is repeated for a number of decreasing fly heights until a sufficient criteria is satisfied (block 48), for example, until the resulting sensor signal exhibits a sufficiently pronounced peak when the excitation frequency substantially equals the ABRF (block 52).

Figure 3:
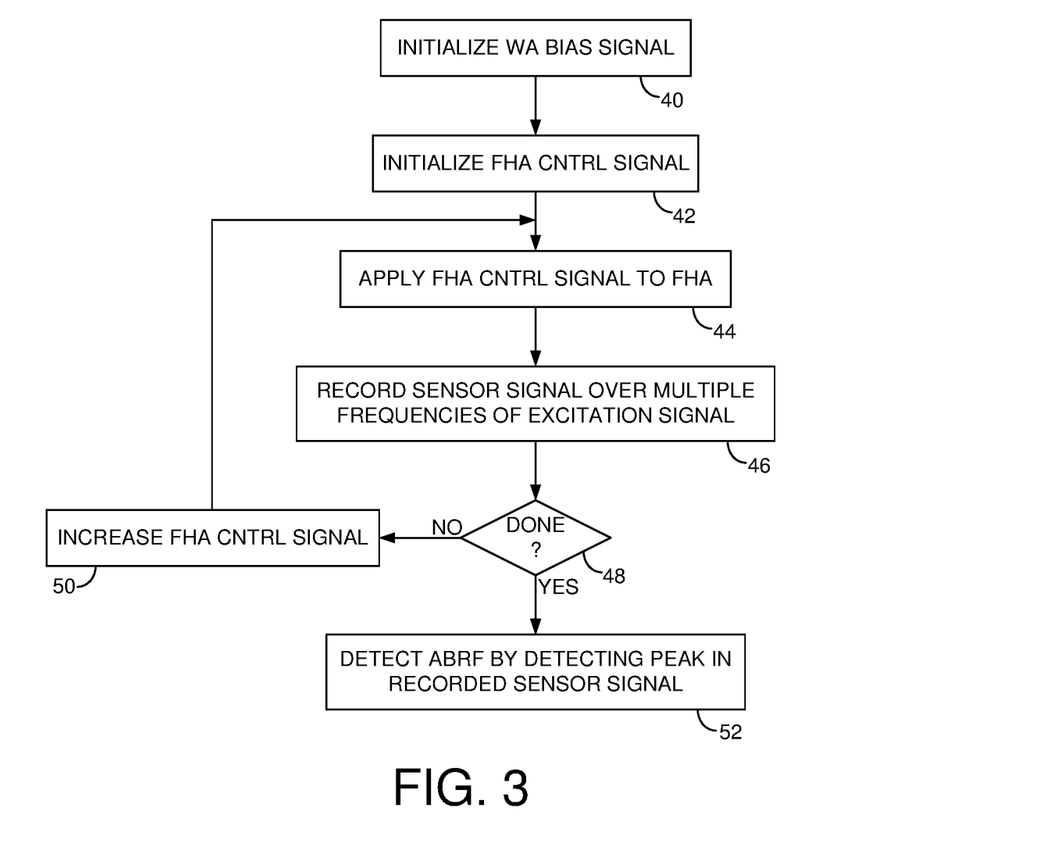
FIG. 3 is a flow diagram according to an embodiment wherein the ABRF is measured by exciting the head over multiple frequencies while decreasing a fly height of the head.
Figure 4A:
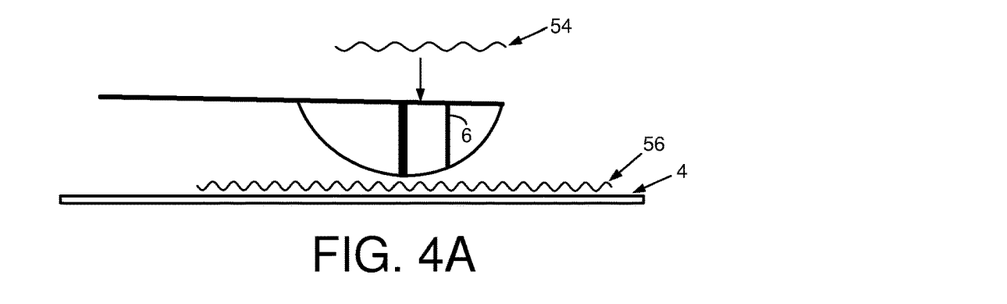
FIGS. 4A and 4B show an embodiment wherein the ABRF may be detected when head touchdown occurs due to the excitation frequency substantially matching the ABRF.
Figure 4B:
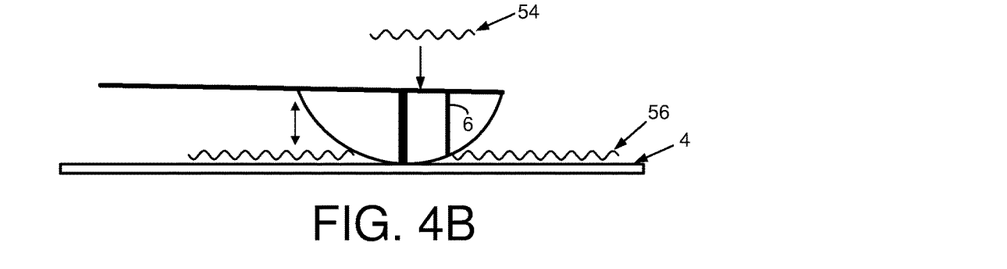
Figure 6:
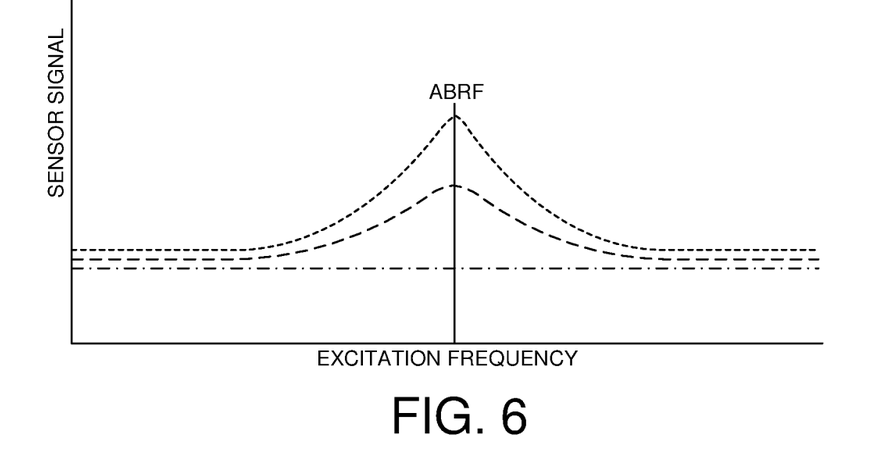
FIG. 6 shows an embodiment wherein the ABRF is detected by sweeping the excitation frequency at different fly heights and detecting a peak in a sensor signal.

The flow diagram of FIG. 3 is further understood with reference to FIG. 4A wherein an excitation signal 54 is used to excite the head 2 at a frequency known to be lower than the ABRF 56 while the write assist element 6 remains substantially unprotruded. At a particular setting for the FHA control signal and corresponding fly height, the head 2 does not contact the disk surface 4 when the excitation signal 54 does not match the ABRF 56 as shown in FIG. 4A. When the excitation signal 54 substantially matches the ABRF 56, it induces an oscillation of the head 2 causing it to effectively bounce off the disk surface 4 as shown in FIG. 4B. In one embodiment, this bouncing contact (or near contact) increases the amplitude of a suitable touchdown sensor signal as shown in FIG. 6. Increasing the frequency of the excitation signal 54 above the ABRF begins to dampen the oscillation of the head 2 and corresponding amplitude of the touchdown sensor signal as shown in FIG. 6. Each plot in FIG. 6 corresponds to a different setting of the FHA control signal (different fly height), wherein in one embodiment the fly height may be decreased incrementally and the excitation signal 54 swept through a range of frequencies until the peak in the touchdown sensor signal is sufficiently pronounced, where the peak corresponds to the detected ABRF as shown in FIG. 6.

Figure 4C:
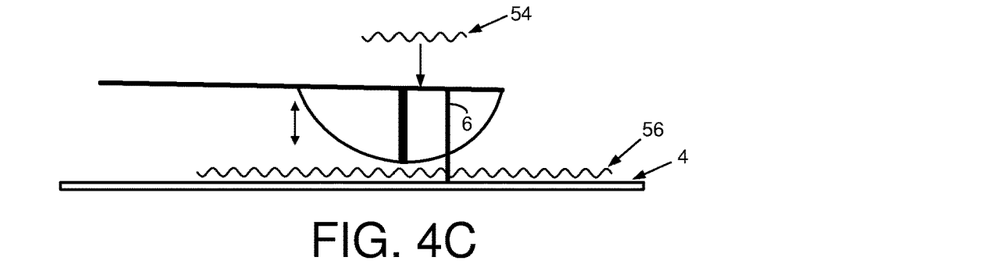
FIGS. 4C and 4D show an embodiment wherein touchdown of the write assist element is detected by exciting the head at the ABRF and reducing the fly height until touchdown occurs.
Figure 7:
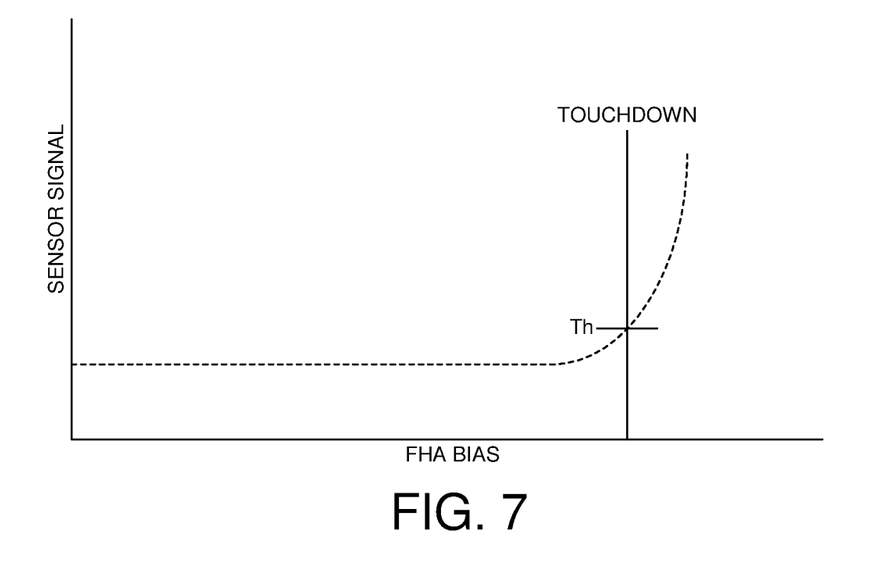
FIG. 7 shows an embodiment wherein touchdown of the write assist element may be detected by exciting the head at the ABRF and decreasing the fly height until a sensor signal exceeds a threshold.

Once the ABRF 56 has been detected, the touchdown procedure is executed in order to calibrate the FHA control signal and corresponding fly height of the head during write operations. During the touchdown procedure, a bias signal is applied to the write assist element 6 so that it protrudes toward the disk surface as shown in FIG. 4C. The frequency of the excitation signal 54 is configured to the detected ABRF 56 and used to excite the head 2 while decreasing the fly height (e.g., by increasing the FHA control signal). When the fly height decreases to a level such that the write assist element 6 begins contacting the disk surface 4, the touchdown may be detected by comparing the amplitude of the touchdown sensor signal to a threshold as shown in FIG. 7. That is, when the touchdown sensor signal exceeds the threshold, the corresponding touchdown FHA control signal is used to configure the operating level during write operations (e.g., by backing off the touchdown FHA control signal by a predetermined offset). In this embodiment, exciting the head 2 at the ABRF 56 during the touchdown procedure amplifies the touchdown sensor signal so that the touchdown event may be accurately detected before damaging the write assist element 6.

Figure 4D:
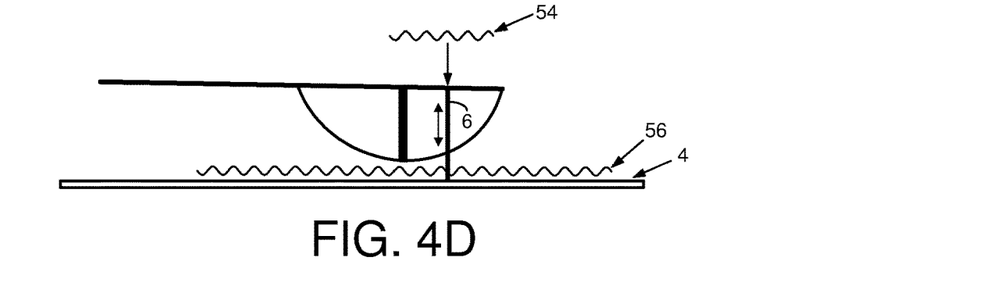

Any suitable technique may be employed to excite the head 2 with the excitation signal 54 when detecting the ABRF 56 as shown in FIG. 4A, or during the touchdown procedure as shown in FIG. 4C. In one embodiment, the excitation signal 54 may be applied to an actuator configured to actuate the head 2 radially over the disk surface 4, such as a voice coil motor (VCM) and/or a microactuator. In one embodiment, a suitable microactuator (e.g., thermal or piezoelectric actuator) may be configured to actuate a suspension relative to an actuator arm, or to actuate a head slider relative to the suspension. In another embodiment, the excitation signal 54 may dither an interface voltage (IV) between the head 2 and the disk surface 4, wherein the excitation signal 54 may be applied to the head 2 and/or to the disk surface 4 in order to dither the electric potential at the head/disk interface. In yet another embodiment, the excitation signal 54 may be applied to one or more elements of the head. For example, the excitation signal 54 may comprise the write signal applied to the write coil 34 of the head 2, or the excitation signal 54 may comprise the control signal applied to the FHA 36. In one embodiment, during the touchdown procedure the excitation signal 54 may be applied to the write assist element 6 as shown in FIG. 4D (i.e., the excitation signal 54 may comprise the bias signal for the write assist element 6), thereby inducing an oscillation of the write assist element 6 that may further amplify the touchdown signal.

Figure 5:
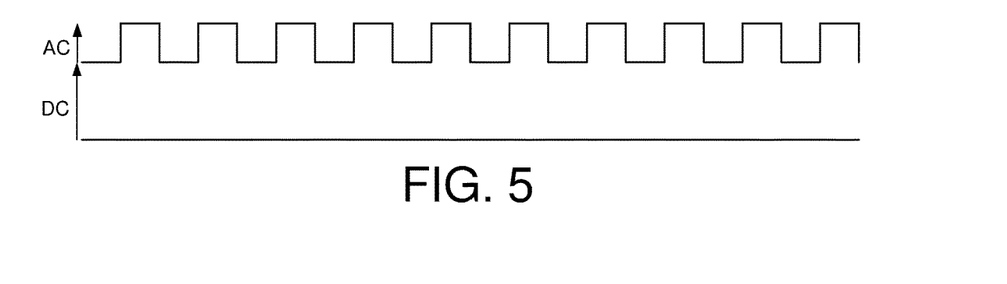
FIG. 5 shows an embodiment wherein during the touchdown procedure the write assist element is excited by an excitation signal comprising a DC component and an AC component (e.g., a square wave) generated at the ABRF.

The excitation signal 54 used to excite the head when detecting the ABRF or during the touchdown procedure may be generated in any suitable manner. In one embodiment, the excitation signal 54 may be generated as a varying frequency sinusoid as shown in FIG. 4A. In another embodiment, the excitation signal 54 may consist of suitable periodic signal, such as a rectangular wave, square wave, sawtooth wave, etc., having a varying fundamental frequency. In one embodiment shown in FIG. 5, the excitation signal 54 may comprise a DC component and an AC component, wherein the AC component is generated at the ABRF 56 during the touchdown procedure. In one embodiment, the amplitude of the DC and/or the AC component may be calibrated to optimize the detection of the ABRF 56 and/or the touchdown detection. In yet another embodiment, the amplitude of the DC and/or the AC component may be adjusted during the ABRF detection procedure and/or the touchdown detection procedure. For example, the amplitude of the DC and/or the AC component may be swept over a predetermined range at each setting of the FHA control signal (i.e., at each fly height setting).

In one embodiment, during the touchdown procedure described above a write current may be applied to the write coil 34 in order to emulate the protrusion of the write coil 34 during a normal write operation. That is, the protrusion of the write coil 34 (due to thermal expansion) may affect the protrusion of the write assist element 6 and corresponding FHA control signal that causes the write assist element 6 to contact the disk surface during the touchdown procedure.

In one embodiment, the ABRF detection procedure and/or the touchdown detection procedure may be re-executed periodically to account for variations in the disk drive, such as degradation of the head 2 and/or disk surface 4. In another embodiment, one or both detection procedures may be re-executed in order to account for environmental changes of the disk drive, such as changes in temperature, altitude, etc., that may affect the ABRF 56 and/or the fly height of the head 2 at the current FHA control signal setting. In one embodiment, the need to re-execute the touchdown procedure may be detected by detecting a deviation of the touchdown sensor signal while exciting the head with the excitation signal 54. For example, in one embodiment the head may be periodically excited with the excitation signal 54 and the amplitude of the resulting touchdown signal evaluated to detect a deviation that may trigger re-execution of the ABRF and/or touchdown detection procedure.

Any suitable technique may be employed to measure the ABRF 56 at the head/disk interface. In one embodiment, the read signal emanating from the read element 22 during read operations may be processed (in continuous or discrete time) in order to measure the ABRF 56. Any suitable signal processing techniques may be employed to measure the ABRF 56 based on the read signal, an example of which is disclosed in U.S. Pat. No. 6,275,345 entitled "SYSTEM AND METHOD FOR ESTIMATING A FREQUENCY OF SLIDER AIRBEARING RESONANCE" the disclosure of which is incorporated herein by reference. In one embodiment, the ABRF 56 may be updated periodically by processing the read signal during read operations, wherein the updated ABRF 56 may be used to excite the head when re-executing the touchdown procedure to recalibrate the fly height actuator.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive or a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk surface;
    a head actuated over the disk surface, wherein the head comprises a plurality of elements including a write assist element; and
    control circuitry configured to:
        control a bias signal applied to the write assist element such that the write assist element is substantially unprotruded;
        while the write element is substantially unprotruded, measure an air bearing resonant frequency (ABRF) of the head and disk surface;
        control the bias signal applied to the write assist element such that the write assist element protrudes toward the disk surface; and
        while the write assist element protrudes toward the disk surface, excite the head at the measured ABRF and detect the head touching down onto the disk surface.

2. The data storage device as recited in claim 1, further comprising a fly height actuator (FHA), wherein the control circuitry is further configured to measure the ABRF by increasing a control signal applied to the FHA in order to decrease a fly height of the head.

3. The data storage device as recited in claim 1, further comprising a fly height actuator (FHA), wherein the control circuitry is further configured to detect the head touching down onto the disk surface by increasing a control signal applied to the FHA in order to decrease a fly height of the head.

4. The data storage device as recited in claim 1, wherein the write assist element comprises a heat assisted magnetic recording (HAMR) element.

5. The data storage device as recited in claim 1, wherein the write assist element comprises a microwave assisted magnetic recording (MAMR) element.

6. The data storage device as recited in claim 1, wherein the control circuitry is configured to excite the at least one of the head elements at the measured ABRF by applying the bias signal to the write assist element, wherein:
    the bias signal comprises a DC component and an AC component; and
    a frequency of the AC component is substantially equal to the measured ABRF.

7. The data storage device as recited in claim 1, wherein the control circuitry is further configured to detect the head touching down onto the disk surface based on a sensor signal generated by at least one of the head elements.

8. The data storage device as recited in claim 7, wherein the sensor signal is generated by a read element.

9. The data storage device as recited in claim 7, wherein the sensor signal is generated by a touchdown sensor.

10. The data storage device as recited in claim 1, further comprising an actuator configured to actuate the head radially over the disk surface, wherein the control circuitry is further configured to measure the ABRF by at least:
    applying an actuator signal to the actuator;
    monitoring a sensor signal generated by at least one of the head components at different frequencies of the actuator signal; and
    measuring the ABRF based on the sensor signal.

11. A data storage device comprising:
    a disk surface;
    a head actuated over the disk surface, wherein the head comprises a plurality of elements including a write assist element and a fly height actuator; and
    control circuitry configured to:
        control a bias signal applied to the write assist element such that the write assist element is unprotruded;
        while the write element is substantially unprotruded, measure an air bearing resonant frequency (ABRF) of the head and disk surface;
        control the bias signal applied to the write assist element such that the write assist element protrudes toward the disk surface; and
        while the write assist element protrudes toward the disk surface, excite the head at the measured ABRF in order to calibrate a control signal applied to the fly height actuator during write operations.

12. The data storage device as recited in claim 11, wherein the control circuitry is further configured to measure the ABRF by increasing the control signal applied to the FHA in order to decrease a fly height of the head.

13. The data storage device as recited in claim 11, wherein while the write assist element protrudes toward the disk surface the control circuitry is further configured to detect the write assist element touching down onto the disk surface by increasing a control signal applied to the FHA in order to decrease a fly height of the head.

14. The data storage device as recited in claim 11, wherein the write assist element comprises a heat assisted magnetic recording (HAMR) element.

15. The data storage device as recited in claim 11, wherein the write assist element comprises a microwave assisted magnetic recording (MAMR) element.

16. The data storage device as recited in claim 11, wherein the control circuitry is configured to excite the at least one of the head elements at the measured ABRF by generating an excitation signal comprising a DC component and an AC component, wherein a frequency of the AC component is substantially equal to the measured ABRF.

17. The data storage device as recited in claim 11, wherein the control circuitry is further configured to detect the head touching down onto the disk surface based on a sensor signal generated by at least one of the head elements.

18. The data storage device as recited in claim 11, further comprising an actuator configured to actuate the head radially over the disk surface, wherein the control circuitry is further configured to measure the ABRF by at least:

applying an actuator signal to the actuator;
monitoring a sensor signal generated by at least one of the head elements at different frequencies of the actuator signal; and
measuring the ABRF based on the sensor signal.

19. A data storage device comprising:
a disk surface;
a head actuated over the disk surface, wherein the head comprises a plurality of elements including a write assist element and a fly height actuator;
a means for controlling a bias signal applied to the write assist element such that the write assist element is substantially unprotruded;
while the write element is substantially unprotruded, a means for measuring an air bearing resonant frequency (ABRF) of the head and disk surface;
a means for controlling the bias signal applied to the write assist element such that the write assist element protrudes toward the disk surface; and
while the write assist element protrudes toward the disk surface, a means for exciting the head at the measured ABRF and detecting the head touching down onto the disk surface.

\* \* \* \* \*